United States Patent
Zhang

(10) Patent No.: US 8,577,077 B2
(45) Date of Patent: *Nov. 5, 2013

(54) SYSTEM FOR IDENTIFYING MOTION VIDEO/AUDIO CONTENT

(75) Inventor: Ji Zhang, Monte Sereno, CA (US)

(73) Assignee: Yuvad Technologies Co., Ltd., Beijing (CN)

( * ) Notice: Subject to any disclaimer, the term of this patent is extended or adjusted under 35 U.S.C. 154(b) by 1501 days.

This patent is subject to a terminal disclaimer.

(21) Appl. No.: 12/085,752

(22) PCT Filed: May 22, 2008

(86) PCT No.: PCT/CN2008/071041
§ 371 (c)(1),
(2), (4) Date: May 30, 2008

(87) PCT Pub. No.: WO2009/140824
PCT Pub. Date: Nov. 26, 2009

(65) Prior Publication Data
US 2010/0171879 A1   Jul. 8, 2010

(51) Int. Cl.
*G06K 9/00* (2006.01)

(52) U.S. Cl.
USPC ............. 382/100; 382/194; 382/305; 725/19

(58) Field of Classification Search
USPC ................................. 382/100, 194; 725/19
See application file for complete search history.

(56) References Cited

U.S. PATENT DOCUMENTS 3,919,479 A    11/1975  Moon et al.
4,441,205 A *   4/1984  Berkin et al. ................. 382/151
5,019,899 A *   5/1991  Boles et al. ..................... 725/22
5,870,754 A     2/1999  Dimitrova et al.
5,926,223 A     7/1999  Hardiman (Continued)

FOREIGN PATENT DOCUMENTS

CN   1190218 A   8/1998
CN   2387588 Y   7/2000

(Continued)

OTHER PUBLICATIONS

Non-final Office Action dated Oct. 26, 2010, for U.S. Appl. No. 12/085,928.

(Continued)

*Primary Examiner* — Aaron W Carter
(74) *Attorney, Agent, or Firm* — Vista IP Law Group, LLP

(57) ABSTRACT

A system for identifying motion video/audio content by means of comparing a video A to a registered video B so as to determine if they are originally the same as each other, wherein said system at least comprises a fingerprint extractor A for fingerprint A from the video A; a fingerprint database for the registered video B; and a matcher which is adapted to search from the fingerprint database for the registered fingerprint B of the video B by means of comparison of fingerprint A with a shifting window of a possible fingerprint B, so as to determine that the video A is visually identical to the video B if a match is found. According to the present invention, the method for extracting a fingerprint data from video/audio signals facilitates the automatic identification, archiving and search of video content, and can be of archiving without the need for human visual inspections.

9 Claims, 8 Drawing Sheets

(56) References Cited

U.S. PATENT DOCUMENTS

| | | |
|---|---|---|
| 6,084,539 A | 7/2000 | Yamada |
| 6,473,529 B1* | 10/2002 | Lin ................. 382/236 |
| 6,834,308 B1 | 12/2004 | Ikezoye et al. |
| 7,336,841 B2 | 2/2008 | Neogi |
| 7,634,147 B2 | 12/2009 | Neogi |
| 7,690,011 B2* | 3/2010 | Lienhart et al. ............ 725/25 |
| 7,738,704 B2* | 6/2010 | Lienhart et al. .......... 382/181 |
| 7,809,154 B2* | 10/2010 | Lienhart et al. .......... 382/100 |
| 8,023,757 B2 | 9/2011 | Neogi |
| 8,027,565 B2* | 9/2011 | Zhang ................... 386/241 |
| 8,073,194 B2* | 12/2011 | Lienhart et al. .......... 382/100 |
| 8,351,643 B2 | 1/2013 | Radhakrishnan et al. |
| 8,365,216 B2* | 1/2013 | Lienhart et al. ............ 725/32 |
| 8,374,387 B2* | 2/2013 | Lienhart et al. .......... 382/100 |
| 2003/0126276 A1 | 7/2003 | Kime et al. |
| 2004/0021669 A1 | 2/2004 | Fredlund et al. |
| 2004/0240562 A1* | 12/2004 | Bargeron et al. ...... 375/240.29 |
| 2005/0141707 A1 | 6/2005 | Haitsma et al. |
| 2005/0149968 A1* | 7/2005 | Konig et al. ............ 725/32 |
| 2005/0172312 A1* | 8/2005 | Lienhart et al. ............ 725/19 |
| 2005/0177847 A1* | 8/2005 | Konig et al. ............ 725/41 |
| 2005/0213826 A1 | 9/2005 | Neogi |
| 2006/0129822 A1* | 6/2006 | Snijder et al. ............ 713/176 |
| 2006/0184961 A1 | 8/2006 | Lee et al. |
| 2006/0187358 A1* | 8/2006 | Lienhart et al. .......... 348/661 |
| 2006/0195859 A1* | 8/2006 | Konig et al. ............ 725/19 |
| 2006/0195860 A1* | 8/2006 | Eldering et al. ............ 725/19 |
| 2006/0248569 A1* | 11/2006 | Lienhart et al. .......... 725/135 |
| 2007/0055987 A1 | 3/2007 | Lu et al. |
| 2007/0071330 A1 | 3/2007 | Oostveen et al. |
| 2007/0124796 A1 | 5/2007 | Wittkotter |
| 2007/0136782 A1 | 6/2007 | Ramaswamy et al. |
| 2007/0162571 A1 | 7/2007 | Gupta et al. |
| 2007/0186228 A1 | 8/2007 | Ramaswamy et al. |
| 2007/0186229 A1 | 8/2007 | Conklin et al. |
| 2008/0123980 A1 | 5/2008 | Neogi |
| 2008/0148309 A1 | 6/2008 | Wilcox et al. |
| 2008/0310731 A1* | 12/2008 | Stojancic et al. .......... 382/195 |
| 2009/0063277 A1 | 3/2009 | Bernosky et al. |
| 2009/0074235 A1 | 3/2009 | Lahr et al. |
| 2009/0092375 A1* | 4/2009 | Berry et al. ............ 386/95 |
| 2009/0154806 A1 | 6/2009 | Chang et al. |
| 2009/0213270 A1 | 8/2009 | Ismert et al. |
| 2009/0324199 A1 | 12/2009 | Haitsma et al. |
| 2010/0066759 A1* | 3/2010 | Zhang ................... 345/620 |
| 2010/0077424 A1 | 3/2010 | Ramaswamy et al. |
| 2010/0122279 A1 | 5/2010 | Zhang |
| 2010/0135521 A1* | 6/2010 | Zhang ................... 382/100 |
| 2010/0158358 A1* | 6/2010 | Lienhart et al. .......... 382/162 |
| 2010/0158488 A1 | 6/2010 | Roberts et al. |
| 2010/0166250 A1* | 7/2010 | Zhang ................... 382/100 |
| 2010/0169911 A1 | 7/2010 | Zhang |
| 2010/0171879 A1* | 7/2010 | Zhang ................... 348/571 |
| 2010/0205174 A1 | 8/2010 | Jiang et al. |
| 2010/0290667 A1* | 11/2010 | Lienhart et al. .......... 382/100 |
| 2010/0303366 A1* | 12/2010 | Zhang ................... 382/218 |
| 2010/0306791 A1 | 12/2010 | Deng |
| 2011/0007932 A1* | 1/2011 | Zhang ................... 382/100 |
| 2012/0063636 A1* | 3/2012 | Lienhart et al. .......... 382/100 |

FOREIGN PATENT DOCUMENTS

| | | | |
|---|---|---|---|
| CN | 1262003 | A | 8/2000 |
| CN | 1341240 | A | 3/2002 |
| CN | 1574953 | A | 2/2005 |
| CN | 1628302 | A | 6/2005 |
| CN | 1679051 | A | 10/2005 |
| CN | 1679261 | A | 10/2005 |
| CN | 1719909 | A | 1/2006 |
| CN | 1723458 | A | 1/2006 |
| CN | 1739121 | A | 2/2006 |
| CN | 2914526 | Y | 6/2007 |
| CN | 101002472 | A | 7/2007 |
| CN | 101021852 | A | 8/2007 |
| CN | 101047833 | A | 10/2007 |
| CN | 101120594 | A | 2/2008 |
| EP | 0838960 | A2 | 4/1998 |
| EP | 1482734 | A2 | 12/2004 |
| EP | 1760693 | A1 | 3/2007 |
| GB | 2419489 | A | 4/2006 |
| JP | 9274467 | A | 10/1997 |
| KR | 20020001088 | A | 1/2002 |
| WO | WO 0209447 | A1 | 1/2002 |
| WO | WO 02065782 | A1 | 8/2002 |
| WO | WO 2006/059053 | A1 | 6/2006 |
| WO | WO 2007/080133 | | 7/2007 |
| WO | WO 2007148264 | A1 | 12/2007 |

OTHER PUBLICATIONS

Non-final Office Action dated Oct. 26, 2010, for U.S. Appl. No. 12/085,754.
Final Office Action dated Apr. 12, 2011, for U.S. Appl. No. 12/085,754.
Non-final Office Action dated Nov. 29, 2010, for U.S. Appl. No. 12/085,830.
Final Office Action dated Aug. 19, 2011, for U.S. Appl. No. 12/085,830.
Non-final Office Action dated Nov. 29, 2010, for U.S. Appl. No. 12/085,927.
Final Office Action dated May 26, 2011, for U.S. Appl. No. 12/085,927.
Non-final Office Action dated Oct. 13, 2010, for U.S. Appl. No. 12/085,765.
Final Office Action dated Mar. 31, 2011, for U.S. Appl. No. 12/085,765.
Non-final Office Action dated Aug. 30, 2010, for U.S. Appl. No. 12/085,829.
Final Office Action dated May 19, 2012, for U.S. Appl. No. 12/085,829.
Non-final Office Action dated Oct. 29, 2010, for U.S. Appl. No. 12/085,835.
Final Office Action dated Apr. 13, 2011, for U.S. Appl. No. 12/085,835.
Non-final Office Action dated Dec. 1, 2010, for U.S. Appl. No. 12/085,827.
Final Office Action dated Apr. 19, 2012, for U.S. Appl. No. 12/085,827.
Cheung et al., "Efficient Video Similarity Measure With Video Signature", Jan. 2003.
Oostveen et al., "Feature Extraction and a Database Strategy for Video Fingerprinting", 2002.
Non-final Office Action dated Oct. 13, 2010, for U.S. Appl. No. 12/085,764.
Final Office Action dated Mar. 24, 2011, for U.S. Appl. No. 12/085,764.
Non-final Office Action dated Dec. 14, 2010, for U.S. Appl. No. 12/085,823.
Notice of Allowance and Fees Due dated Aug. 19, 2011, for U.S. Appl. No. 12/085,823.
International Preliminary Report on Patentability and Written Opinion dated Dec. 25, 2008, for PCT Application No. PCT/CN2008/071039.
International Search Report dated Dec. 25, 2008, for PCT/CN2008/071039.
International Preliminary Report on Patentability and Written Opinion dated Feb. 26, 2009, for PCT Application No. PCT/CN2008/071083.
International Search Report dated Feb. 26, 2009, for PCT Application No. PCT/CN2008/071083.
International Preliminary Report on Patentability and Written Opinion dated Mar. 12, 2009, for PCT Application No. PCT/CN2008/071082.
International Search Report dated Mar. 12, 2009, for PCT Application No. PCT/CN2008/071082.
International Preliminary Report on Patentability and Written Opinion dated Sep. 4, 2008, for PCT Application No. PCT/CN2008/071046.

(56) References Cited

OTHER PUBLICATIONS

International Search Report dated Sep. 4, 2008, for PCT Application No. PCT/CN2008/071046.
International Preliminary Report on Patentability and Written Opinion dated Sep. 4, 2008, for PCT Application No. PCT/CN2008/071047.
International Search Report dated Sep. 4, 2008, for PCT Application No. PCT/CN2008/071047.
International Preliminary Report on Patentability and Written Opinion dated Mar. 5, 2009, for PCT Application No. PCT/CN2008/071023.
International Search Report dated Mar. 5, 2009, for PCT Application No. PCT/CN2008/071023.
International Preliminary Report on Patentability and Written Opinion dated Mar. 5, 2009, for PCT Application No. PCT/CN2008/071028.
International Search Report dated Mar. 5, 2009, for PCT Application No. PCT/CN2008/071028.
International Preliminary Report on Patentability and Written Opinion dated Feb. 19, 2009, for PCT Application No. PCT/CN2008/071029.
International Search Report dated Feb. 19, 2009, for PCT Application No. PCT/CN2008/071029.
International Preliminary Report on Patentability and Written Opinion dated Feb. 12, 2009, for PCT Application No. PCT/CN2008/071030.
International Search Report dated Feb. 12, 2009, for PCT Application No. PCT/CN2008/071030.
International Preliminary Report on Patentability and Written Opinion dated Feb. 26, 2009, for PCT Application No. PCT/CN2008/071038.
International Search Report dated Feb. 26, 2009, for PCT Application No. PCT/CN2008/071038.
International Preliminary Report on Patentability and Written Opinion dated Feb. 26, 2009, for PCT Application No. PCT/CN2008/071033.
International Search Report dated Feb. 26, 2009, for PCT Application No. PCT/CN2008/071033.
International Preliminary Report on Patentability and Written Opinion dated Oct. 16, 2008, for PCT Application No. PCT/CN2008/071041.
International Search Report dated Oct. 16, 2008, for PCT Application No. PCT/CN2008/071041.
English Abstract of JP 9274467 A dated Oct. 21, 1997.
English Abstract of CN 101002472 A dated Jul. 18, 2007.
English Abstract of CN 1739121 A dated Feb. 22, 2006.
English Abstract of CN 101120594 A dated Feb. 6, 2008.
English Abstract of CN 1719909 A dated Jan. 11, 2006.
English Abstract of WO 0209447 A1 dated Jan. 31, 2002.
English Abstract of CN 101047833 A dated Oct. 3, 2007.
English Abstract CN 2914526 Y dated Jun. 20, 2007.
English Abstract CN 1262003 A dated Aug. 2, 2000.
English Abstract CN 2387588 Y dated Jul. 12, 2000.
English Abstract CN 1679261 A dated Oct. 5, 2005.
English Abstract CN 1574953 A dated Feb. 2, 2005.
English Abstract CN 1628302 A dated Jun. 15, 2005.
English Abstract CN 1190218 A dated Aug. 12, 1998.
English Abstract CN 1341240 A dated Mar. 20, 2002.
English Abstract CN 1723458 A dated Jan. 18, 2006.
English Abstract CN 101021852 A dated Aug. 22, 2007.
English Abstract CN 1679051 A dated Oct. 5, 2005.
English Abstract KR 20020001088 A dated Jan. 9, 2002.
Notice of Allowance and Fees Due dated Oct. 24, 2012, for U.S. Appl. No. 12/085,829.
Notice of Allowance and Fees Due dated Dec. 20, 2012, for U.S. Appl. No. 12/085,830.
Non-final Office Action dated Jan. 2, 2013, for U.S. Appl. No. 12/085,764.
Notice of Allowance and Fees Due dated Jan. 4, 2013 for U.S. Appl. No. 12/085,927.
Notice of Allowability dated Feb. 15, 2013, for U.S. Appl. No. 12/085,927.
Notice of Allowance and Fees Due dated Mar. 4, 2013 for U.S. Appl. No. 12/085,834.
Notice of Allowance and Fees Due dated May 24, 2013 for U.S. Appl. No. 12/085,764.
Notice of Allowance and Fees Due dated Aug. 15, 2013 for U.S. Appl. No. 12/085,827.

* cited by examiner

Plot of the time-series of the correlation between two fingerprint arrays

SYSTEM FOR IDENTIFYING MOTION VIDEO/AUDIO CONTENT

RELATED APPLICATIONS

This application is the U.S. National Phase under 35 U.S.C. §371 of International Application No. PCT/CN2008/071041, filed on May 22, 2008, the disclosure of which Application is incorporated by reference herein.

FIELD OF THE PRESENT INVENTION

The present invention relates to system for identifying motion video/audio content, more particularly, the present invention relates to a system for identifying fingerprints of motion video content.

The so called term "fingerprint" appearing in this specification means a series of dot information, in which each dot information is selected from a frame of pattern of television signals, and a plurality of frames can be selected from the television signals, and one or more dot data can be selected from one frame of pattern of television signals, so that the so called "fingerprint" can be used to uniquely identify the said television signals.

BACKGROUND OF THE PRESENT INVENTION

Because of digital compression technology, more television channels are transmitted over the same analog spectrum, and there are more channels for viewers to watch. Digitally compressed video and audio signals are binary data streams that can be transmitted, stored and played out as computer data files or streams. Therefore, digital video/audio data are typically handled in digital forms during production, transmission and storage phases.

Organizing digital video content is becoming a major challenge for all content owners, video and broadband interne service providers, and even home users. This is because, unlike text, video content cannot be searched and identified easily by computers. Unlike audio, video content data has far larger data size. In addition, it is very difficult and inefficient to identify video content by human visual inspections since the process is very time-consuming and expensive. These factors makes it difficult to effectively organize, archive, and search video content. However, the need for searching and identifying video content is increasingly important with applications in video surveillance, copyright content monitoring, television commercials monitoring, intelligent video advertising, and government regulatory television programming monitoring.

Therefore, there is a need to identify motion video content efficiently and automatically, and with minimal or no human interactions.

There is also a need to identify motion video content without having access to the full resolution digitized video content data.

There is also a need to identify motion video content at the possible highest speed with minimal storage capacity required and possible minimal data transfer bandwidth.

There is a need to provide a system for facilitating the archiving and search of video content without a huge storage capacity required, and to be able to search the information easily at low hardware cost. There is also a need to collect statistics and extraction additional information from the archived video information automatically.

SUMMARY OF THE PRESENT INVENTION

It is object of the present invention to provide a system for identifying motion video/audio content to facilitate the automatic identification, archiving and search of video content.

It is another object of the present invention to provide a system for identifying motion video/audio content to extract fingerprint information from video content for the purpose of archiving without the huge storage capacity required.

It is another object of the present invention to provide a system for identifying motion video/audio content to search through video fingerprint data for identifying historical recording of video content.

It is another object of the present invention to provide a system for identifying motion video/audio content, that can be used to identify motion video content by first extracting information from a given video content segment and use the extracted information to further automatically identify the same video content if it is ever to appear again in a different video data stream.

It is another object of the present invention to provide a system for identifying motion video/audio content, which is used for extracting information from a given video content data, so-called the fingerprinting process, and shows how to use the fingerprint data to seek a match within a different video content.

Therefore, according to the present invention, there is provided a system for identifying motion video/audio content by means of comparing a video A to a registered video B so as to determine if they are originally the same as each other, wherein said system at least comprises a fingerprint extractor A for fingerprint A from the video A; a fingerprint database for the registered video B; and a matcher which is adapted to search from the fingerprint database for the registered fingerprint B of the video B by means of comparison of fingerprint A with a shifting window of a possible fingerprint B, so as to determine that the video A is identical to the video B if a match is found.

According to the present invention, the system for extracting a fingerprint data from video/audio signals can be of archiving without the huge storage capacity required.

BRIEF DESCRIPTION OF THE ACCOMPANYING DRAWINGS

DETAILED DESCRIPTION OF THE PRESENT INVENTION

In the context of this specification, discussions are focused on the handling and processing of video signals. The method can be extended to audio signals by using variations of the techniques and will not be discussed here.

Specially, discussions are focused on the handling of video signals, although in most cases, video signals come together with audio signals as an integral part of the audio/video program. The audio signal will be considered in synchronization with the video signal. Fingerprint operations on the video signal identify the video content as well as the associated audio content. Therefore, in this specification, discussions are limited on dealing with fingerprint operations on video signal only.

It is also assumed that the video signal has been digitized. It's possible to extend the idea to analog video content as well by first digitizing the analog video signal into digital video frames before applying the methods described herein. Therefore, it does not show how to deal with analog video content in this specification.

In addition, it is assumed that the digital video content is in uncompressed formats and organized as digital video frames. For compressed video data stream, such as MPEG-2, MPEG-4 or other compressed formats, decompression (or decoding) of the video data stream into digital video frames is required before applying the method used herein.

Lastly, it is assumed that all video frames are in progressive format, which means that each video frame is displayed at the decoder together. For interlaced video frames, the frame is displayed in two separate time instances as two (top and bottom) fields. In this case, it is assumed that all of the processing described below applies to the fields.

In this invention, it is provided a system for identifying motion video/audio content.

Figure 1:
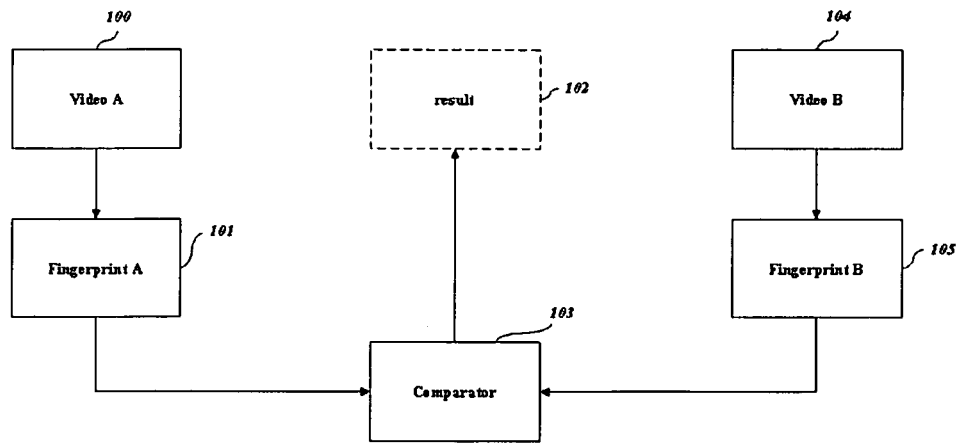
FIG. 1 is a schematic view for the key components in comparing two pieces of video content.

FIG. 1 shows two video content pieces, video A and video B. As shown in FIG. 1, the reference number of video A is 100, the reference number of video B is 104, the reference number of Fingerprint A is 101, the reference number of Fingerprint B is 105, the reference number of comparator is 103, and the reference number of comparing result is 102. The two video contents 100 and 104 can be compared to determine if they are visually identical. The invention described herein can be used to determine if video A and video B are visually identical by comparing their video fingerprints. Fingerprint A and fingerprint B are the extracted fingerprint data from video A and B respectively. Instead of comparing video A and B, the comparator compares fingerprint A and B and determine if the result is a match or not.

Figure 2:
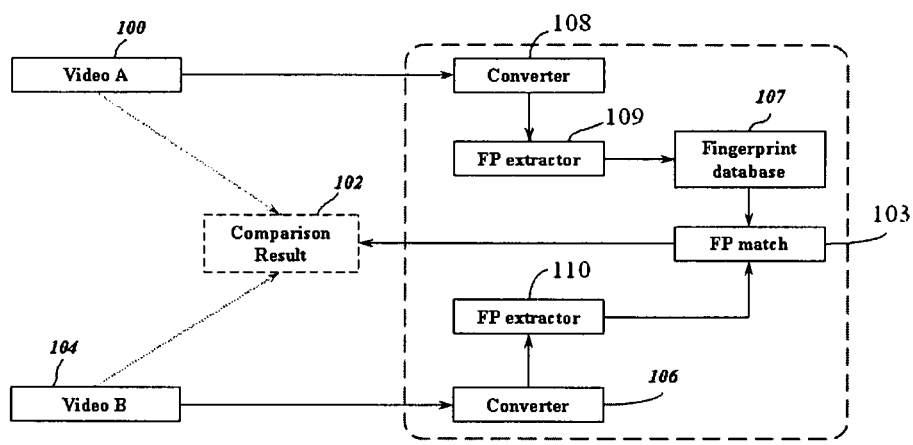
FIG. 2 is a schematic view for comparing two pieces of video content with the help of a fingerprint database.

Referring to FIG. 2, the comparing process is elaborated in greater details. Video content to be compared are Video A 100 and video content Video B 104. The two video content pieces must first go through converters 108, 106, which digitize the video content if it's originally in analog format, or decompress the data stream if the video is stored in compressed data format. The output of the converters 108, 106 is time-consecutive digitized video images. The fingerprint extractors 109, 110 process the video images and obtain the fingerprint data from both video A 100 and video B 104. In typical cases, it is assumed that video A 100 has gone through the above process and the associated fingerprint data has been saved in a fingerprint database 107. The two fingerprint data segments are then compared by the fingerprint matcher 103 and the comparison result 102 indicates whether the two video content pieces are visually identical.

Figure 3:
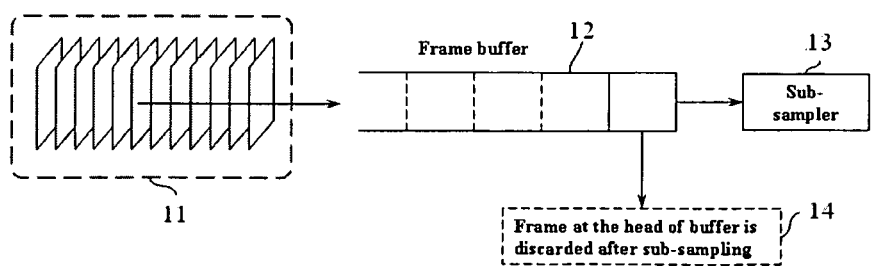
FIG. 3 is a schematic view for sub-sampling of digitized video frames.

Next, it is to describe the fingerprint extraction process in greater detail. FIG. 3 shows the process of extracting fingerprint data from a time-sequence of digitized video images 11, as output of the converters. Video content 11 appears as a time sequence of digital video frames. A frame buffer 12 is used to hold the digitized video images. The frame buffer 12 accepts newer video frame images and discards oldest frame video images, in a first in first out (FIFO) fashion. The sub-sampler 13 selectively copies the video image samples. After each video image 11 is sampled at the head of the buffer, it's discarded after the sampling, as shown in step 14. The sub-sampler 13 operates on one video frame image at a time.

Figure 4:
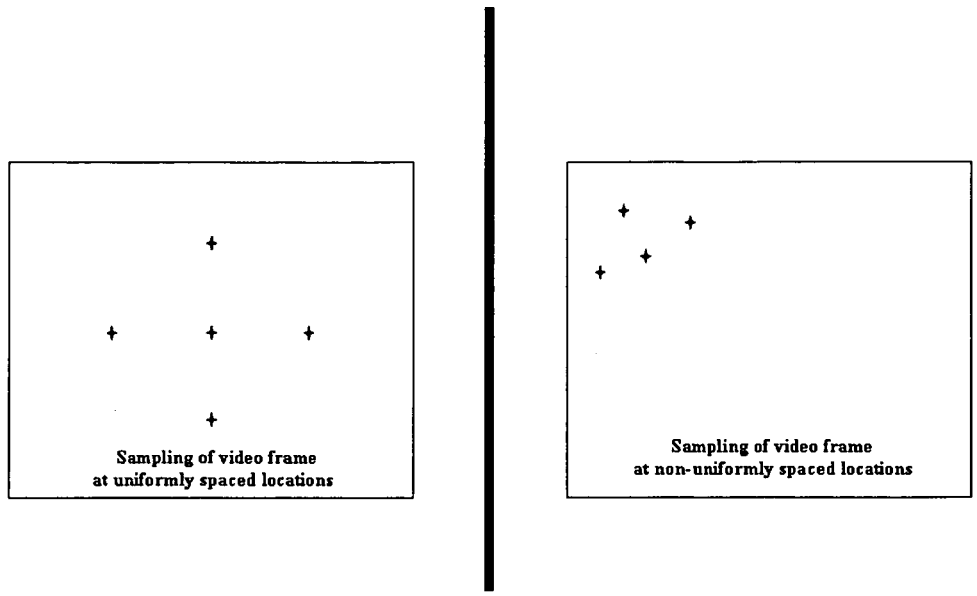
FIG. 4 is a schematic view for different ways to sample a video image.

The sub-sampling operation can be illustrated in FIG. 4. Each video image frame is a rectangular matrix of image samples, organized as rows and columns of image samples. There can be many different ways to sample a video image. On the left of FIG. 4 is a sampling scheme that spaces the samples as uniformly and symmetrically as possible. On the right of the FIG. 4 is another sampling scheme, which samples the image at four different locations, and in this sampling scheme, the sampling locations are somewhat arbitrary.

Preferably, in such a sampling scheme, the samples should be taken as evenly distributed in the frame as possible, with the center of the frame as the center of the sub-sampling.

Figure 5:
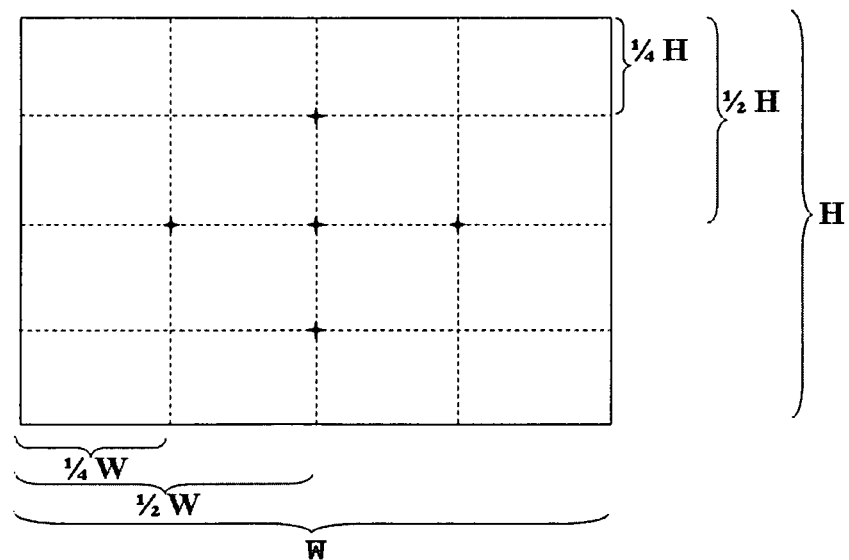
FIG. 5 is a schematic view for sampling a video image in proportion to the video resolution.

One preferable sub-sampling of the frame is shown in FIG. 5 which is a sampling scheme with 5 samples per image. The sampling positions are positioned according to the relative scale of the video frame. In this way, the sampling positions are not affected by the frame resolutions. In this scheme, the 5 samples are spaced apart as an integer fraction of the frame resolution. If the video frame height is H and width is W, then the 5 samples are spaced at the intersections of ½ H and ½ W, ½ H and ¼ W, ½ H and ¾ W, ¼ H and ½ W, and ¾ H and ½ W.

Of course, there can be other methods of sub-sampling, but it will continue to use the above sub-sampling scheme to describe the rest of the methods. Those skilled in the art will be able to expand the method to other sub-sampling schemes, with more or fewer than 5 samples per video frame, or sub-sampling at varying number of pixels per video frame.

Preferably, the sampling scheme is independent of the frame resolution or aspect ratio, making it more robust for dealing with video content of different resolutions and aspect ratios.

Figure 6:
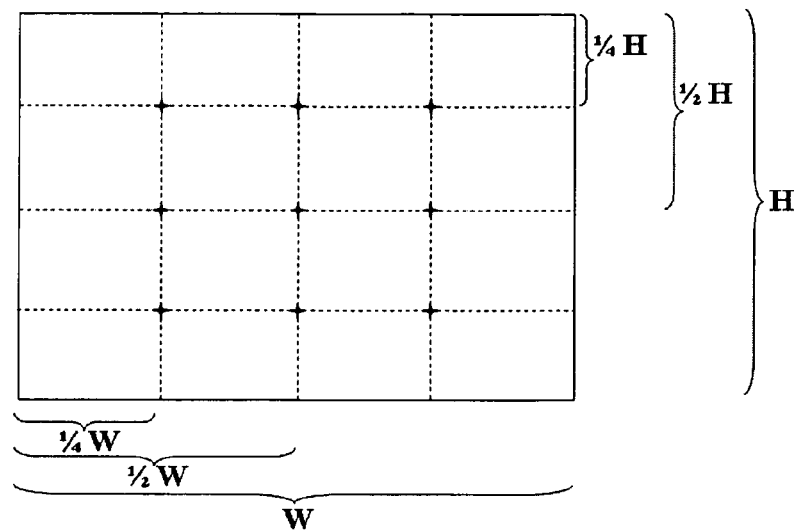
FIG. 6 is a schematic view for sampling a video image with 9 samples.

If more samples are to be sampled from a single image, preferably, the sampling locations contains the previously defined 5 sample locations. For example, FIG. 6 shows a 9 sample constellation that is a superset of the previous 5 sample constellation of FIG. 5. In this way, the fingerprint data obtained from the 9 sample constellation contains the 5 sample constellation as a subset.

Next, it is to focus on the 5 sample constellation and discuss how to organize the sample data into what the so-called fingerprint data after multiple video images are sampled.

Figure 7:
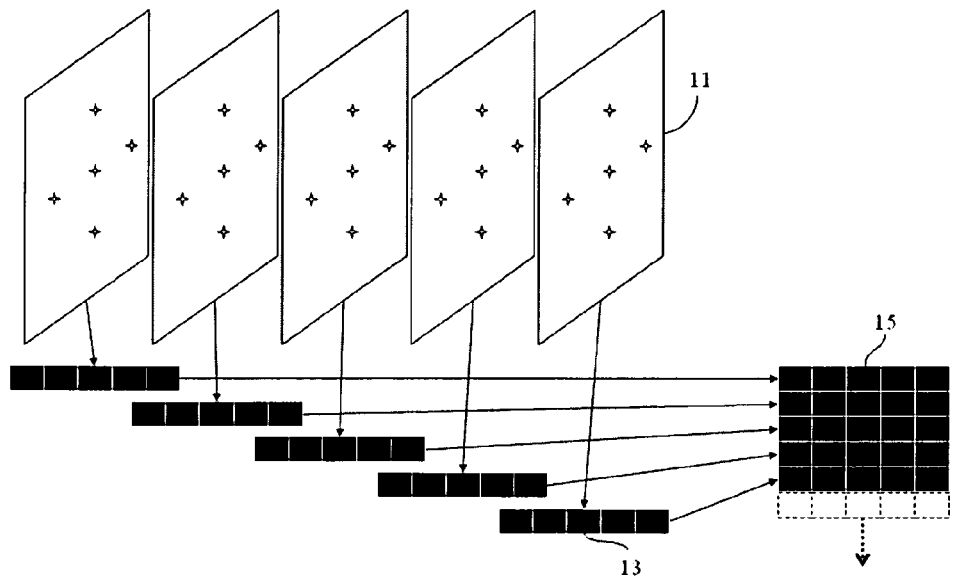
FIG. 7 is a schematic view for sampling consecutive video images and packet them into an array.

The sub-sampled values are saved for each of the frames. From the above description, it is noted that 5 frame samples are obtained for each video frame. It can repeat this process for several consecutive N video frames. For example, it can sub-sample N=50 consecutive video frames. And then organize the sub-sampled values into a 5×50 array. This sub-sampling process is shown in FIG. 7. FIG. 7 also shows how the samples from multiple video frames are organized. In FIG. 7, video frames are identically sub-sampled spatially, and the samples are gathered into an array. In this example, 5 samples are collected from each video frame and they are organized sequentially. Samples for time consecutive video frames are made and organized into a two-dimensional array, each row corresponds to a sample set of a video frame.

This array is the so-called the fingerprint of the video content. From the above description, it is noted that the fingerprint covers only 50 video frames, for PAL video format, it's 2 seconds worth of video, for NTSC, it's less then 2 seconds. If it can uniquely identify this N video frames through the sub-sampled values, then it can significantly reduce the computation and storage required for the identification.

In this particular example, the fingerprint only identifies the 50 video frames within the video content, but not the remainder of the video content. For most video content, where the content titles are usually static, uniquely identifying a segment of the content is sufficient to uniquely identifying the entire video content title.

Figure 8:
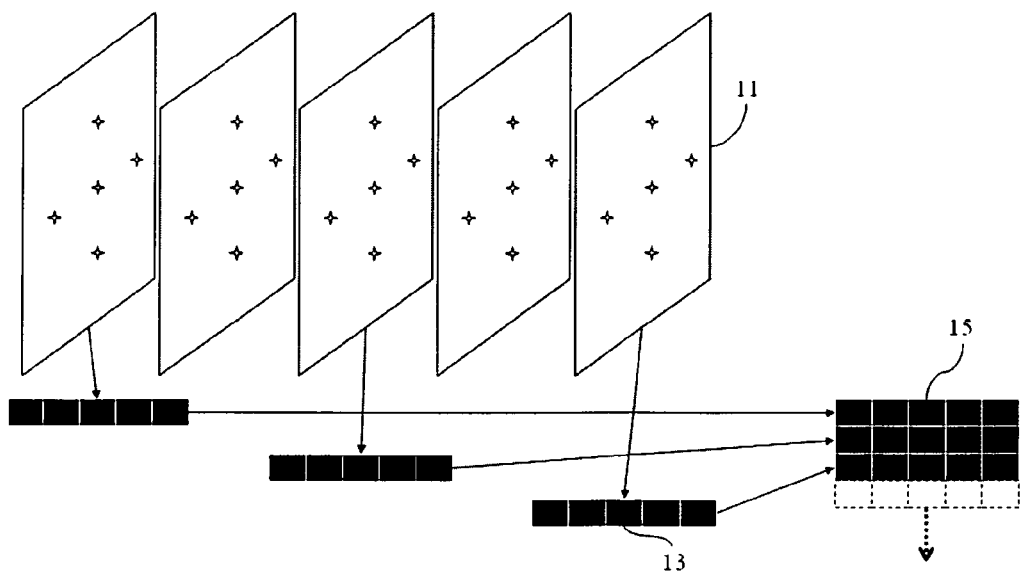
FIG. 8 is a schematic view for selectively sampling the video images.

Alternatively, the sampling may be done only on some of the video frames. For example, it may be done only once every other frame, as shown in FIG. 8. But preferably, the sampling locations remain the same for those images being sampled.

For video content where segments of which may be re-arranged, a group of video images may not be sufficient to uniquely identify video content if some of the sections are re-arranged.

Figure 9:
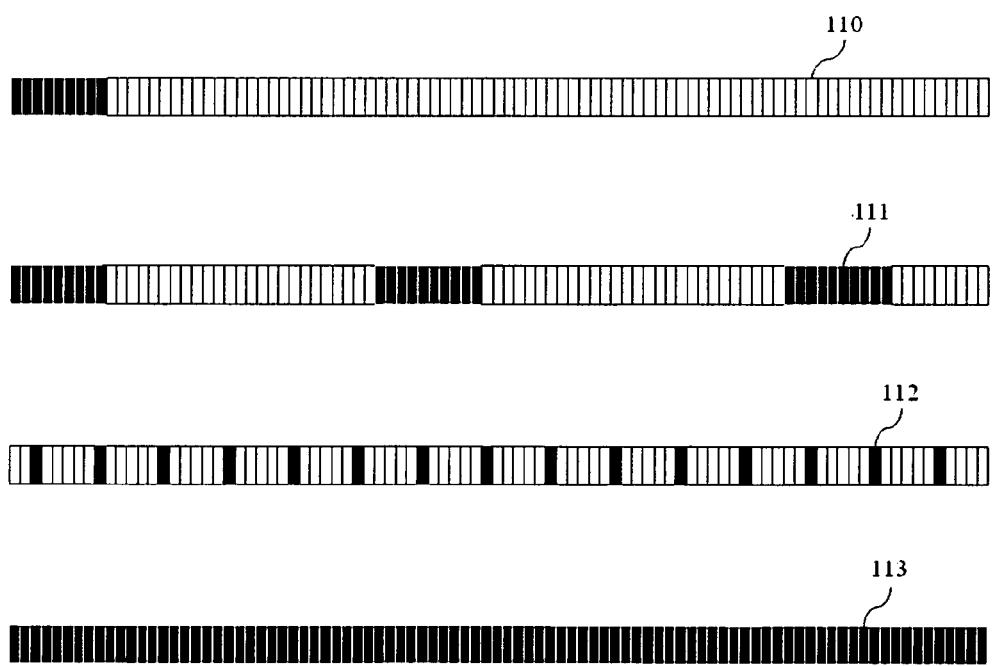
FIG. 9 is a schematic view for different ways to selectively sampling video images.

In these cases, it needs to do sub-sampling of more frames. Therefore, there are provided several preferable ways to determine the number of video frames to sub-sample, that is:

to sub-sample N consecutive video frames on somewhere in the video content, for example at the beginning of the video content;

to sub-sample N consecutive video frames at fixed time intervals; to sub-sample one video frame every N consecutive frames (this is also shown in FIG. 9); and to sub-sample all of the video frames for the entire video content title.

This can be illustrated in FIG. 9. Obviously the first method requires the least amount of computations, memory and storage. The last method requires the most.

Preferably, samples from consecutive video frames are organized in a continuous two-dimensional array of sampled values. This sampled array is the so-called the fingerprint for the sampled video content.

In FIG. 9, in sampling method 110, it sub-sample only the first N frames; in sampling method 111, it sub-sample N frames periodically; in sampling method 112, it sub-sample one frame every other N frames periodically; and in sampling method 113, it sub-sample all of the frames continuously.

Figure 10:
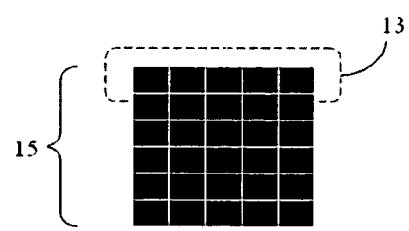
FIG. 10 is a schematic view for packing multiple video image samples into a single data array.

In FIG. 10, fingerprint array 15 is composed of samples from multiple frames, in which different samples 13 are taken from one video frame after another one.

From the above, it is noted that depending on the sampling method used, there maybe more than one fingerprint arrays for a given video content. The video fingerprint, represented as separate groups of continuous arrays, can be used to uniquely represent the video content from which the samples are obtained.

Figure 11:
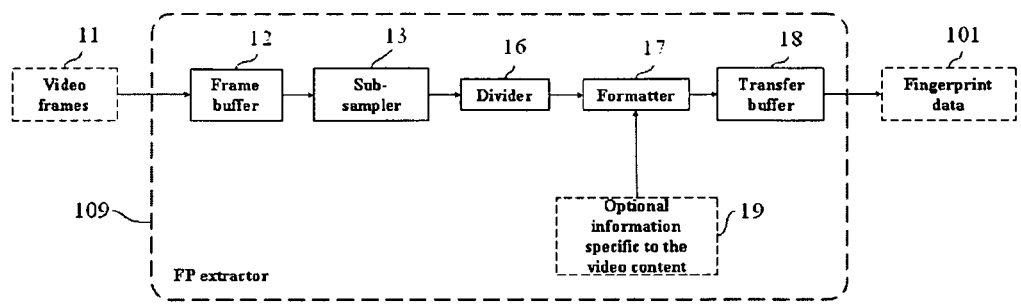
FIG. 11 is a schematic view for the key processing components for a fingerprint extractor.

Besides sampling, the fingerprint extractor 109 can have other processing tasks. To elaborate more on this, refer to FIG. 11. The output of the sub-sampler 13 contains data samples obtained from multiple video frame images. The samples go through a divider 16 which organizes the samples according to groups of video frames. For example, samples from every 100 video frames may be organized as one fingerprint data segment. The formatter 17 is used to incorporate optional information 19 to form the fingerprint data 101. For example, in some cases, there may be a need to include information on the video content that the fingerprint data 101 represents. These may include a brief description of what is the content, where the content was obtained, when the content was obtained, or whether there is any information that may be useful in describing the content itself. Note that the video image content, at the input and output of the formatter 17, has been discarded. Only the fingerprint data 101 and the associated optional information 19 remain. The transfer buffer 18 is used to transfer the resulting fingerprint data 101.

In what follows, it is to focus our discussions on the handling of a single fingerprint array.

Fingerprint Matching

In this section, it is to describe methods for the inverse of the fingerprinting process, i.e., to use the given fingerprint array to seek a match from within a different video content stream which may match partially or entirely the video content represented by the fingerprint.

There are several different scenarios between two pieces of video content from which the fingerprint is extracted. It is assumed video A and video B as the two content pieces to be matched through comparing the fingerprint data associated with the two video contents. If a match is determined to be true, then it concludes that original video contents A and B are identical at least for the sections associated with the matching fingerprint. This process can be illustrated in FIG. 1 and FIG. 2.

Then video A and B may contain identical video content albeit they may be of different resolution, aspect ratio and possibly with different levels of quality degradations. For the purpose of discussions, it will not address these different scenarios. In stead, it will focus on how to seek a match between the fingerprints from the two video sequences.

Figure 12:
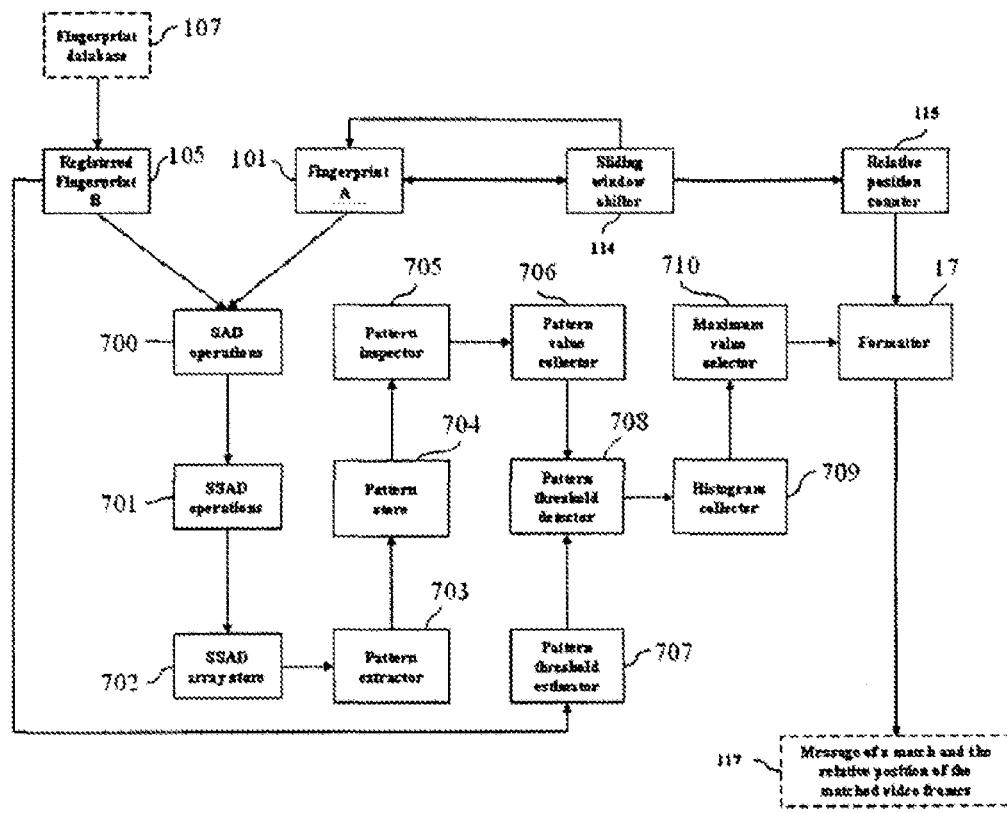
FIG. 12 is a schematic view for the key processing elements for a fingerprint comparator.

Specific steps can be illustrated in FIG. 12. The FIG. 12 contains several key components which will be discussed in greater details here. It is assumed that video B has already been extracted as fingerprint B and is stored in the fingerprint database 107. Fingerprint B therefore is called the registered fingerprint 105. Fingerprint A 101 is from video A and will be compared with fingerprint B. The first step of the comparison is the sum of absolute difference (SAD) operation 103 between the two fingerprints.

The SAD Operation

Figure 13:
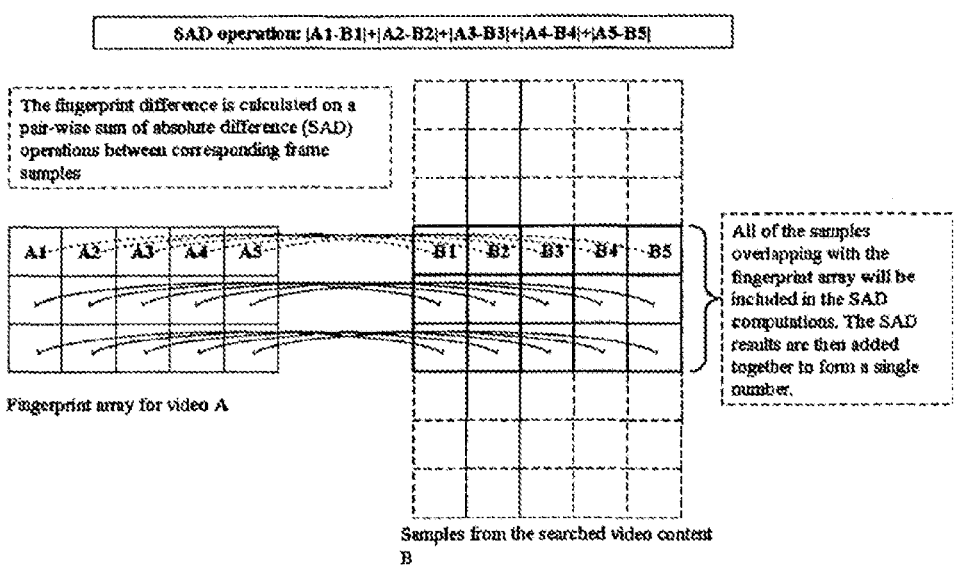
FIG. 13 is a schematic view for performing the SAD operations between two fingerprint arrays.

The SAD operation 700 is performed between the samples obtained from two neighboring video frames. Specifically, consider the example given in FIG. 13 where 5 samples are obtained from the video frame A. Let's denote these samples as A1, A2, A3, A4, A5. It can also obtain 5 samples from the video frame B, and denote the samples as B1, B2, B3, B4, B5. Then the SAD operation between these two frames is given by:

$$SAD(A,B)=|A1-B1|+|A2-B2|+|A3-B3|+|A4-B4|+|A5-B5|$$

where the |A−B| is the absolute value operation.

The SAD operation basically evaluates the differences between the sample sets of the two video frames A and B. Larger value of SAD(A,B) implies bigger image content differences between the two video frames.

The Moving SAD Window and Sum of SAD (SSAD) Array

Figure 14:
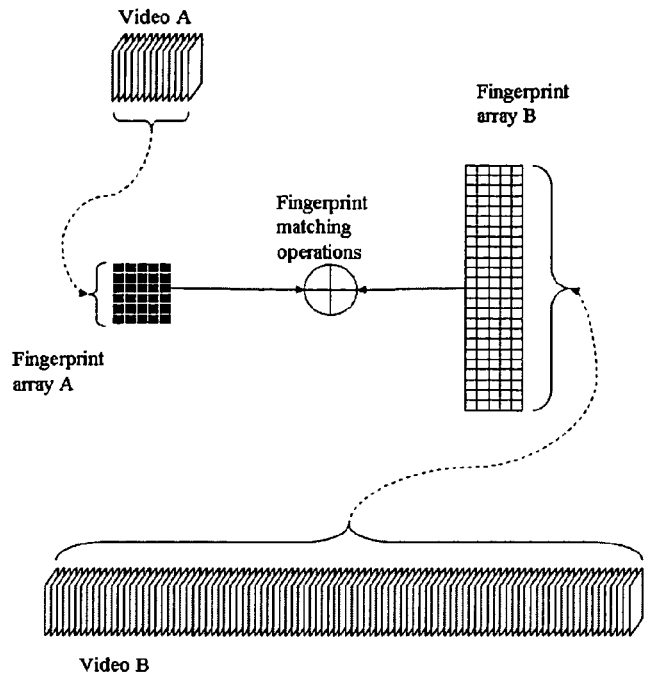
FIG. 14 is another schematic view for performing the matching operations between two fingerprint arrays.

The SAD operation described above is repeated for two fingerprint arrays, one obtained from fingerprint A and the other obtained from the fingerprint B. The goal is to search through fingerprint B to see if there is a its subsection that matches fingerprint A. Consider FIG. 14, where the fingerprint A is assumed to have less numbers of samples than fingerprint B. The moving window of SAD operation is defined as follows:

First, fingerprint A and B are item-wise associated with each other, because fingerprint A is smaller than fingerprint B in number of samples, only some of the samples from within fingerprint B are associated with those within fingerprint A.

Next all of the fingerprint B samples within this window are included in the SAD operations with fingerprint A samples and the results are added together to form a single sum of SAD (SSAD) number.

The same process is then repeated by shifting the position of fingerprint B relative to A by one frame, as shown as 104 and 114 in FIG. 12. Each such shift results in a new SSAD value generated. Therefore, a series of SSAD values are generated and saved in a SSAD array.

The Fingerprint Match Detection

Figure 15:
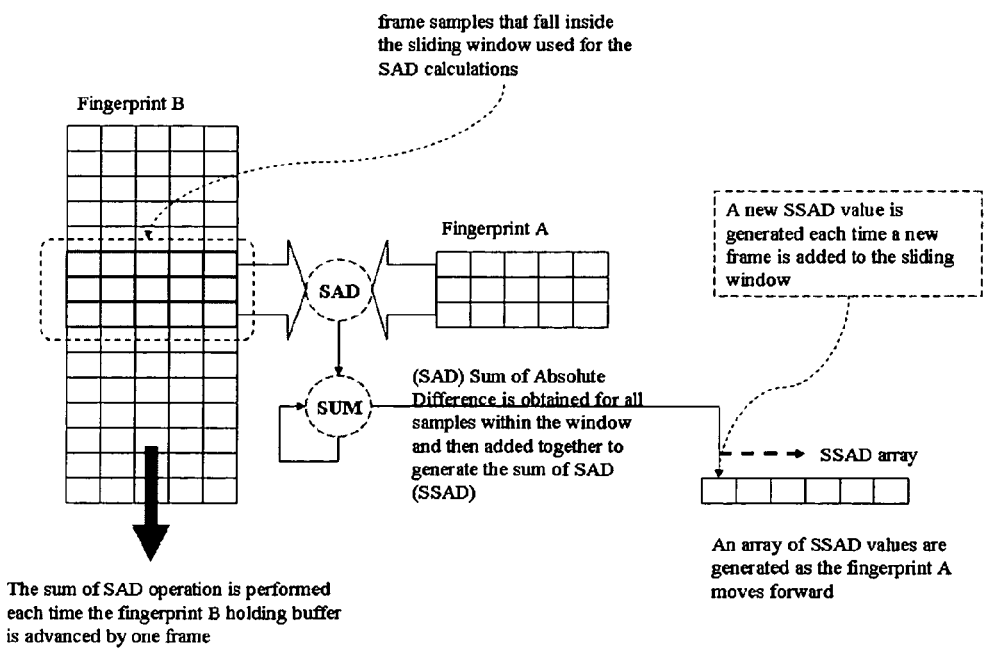
FIG. 15 is a schematic view for obtaining the SSAD array as part of the fingerprint comparison process.

The fingerprint match detection is a process applied to the SSAD time-series of numbers and is shown in FIG. 15. From the previous descriptions, it is noted that SSAD time-series represents a time-shifted measure of the difference between two video frame sequences under comparison. When the SSAD value is low, it means that the two sections of fingerprinted video frames are similar, otherwise they are not. However, due to the fact that there are different resolution, different video quality degradation (due to compression) and different noise level, all contribute the increase in SSAD values. So the absolute values of the SSAD series themselves are not sufficient to determine the location of a possible fingerprint match.

Figure 17:
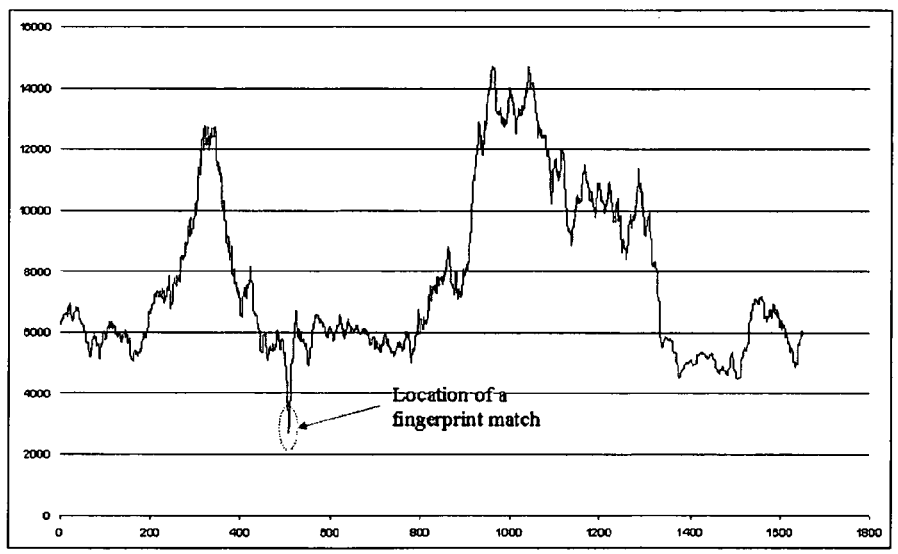
FIG. 17 is a graph view for the time-series of correlations between two fingerprint arrays.

The fingerprint match is identified by a very sharp drop in the SSAD values just before the match and a very sharp increase in SSAD values just after the match. This can be shown in an actually measured SSAD values in FIG. 17.

The element to detect the sharp drop pattern within the SSAD values can be illustrated in FIG. 12. In this diagram, the SSAD values are stored in 702. The pattern extractor 703 inspects all neighboring SSAD values and obtains the so-called the pattern information. Specifically, if SSAD values are S(1), S(2), ..., S(n), S(n+1), and denote the derived pattern values as P(1), P(2), P(3), and so forth.

Clearly, S(n) represents the difference between video A and video B on their respective n-th frame within the fingerprint window. Note that for video fingerprint B, the index n refers to a different video frame each time the fingerprint array B is shifted by one frame relative to fingerprint array A.

The pattern values can be obtained by the pattern extractor 703, which is described as follows:

$$P(n) = (S(n) - S(n-1))/S(n)$$

Note that P(1) is not defined and will not be used. In addition, it does the above only if S(n) is not zero and a certain fixed threshold which will be discussed later in detail. Where the threshold value is chosen by the threshold estimator. Otherwise, P(n) is set to zero.

From this, it is noted that if P(n) is a positive number it means that S(n)>S(n−1), i.e., the SSAD value is increasing, it means that the two represented video frames are becoming more different from each other, indicating less probability that a match will be found. On the other hands, if P(n) is a negative number, it means that the two video frames are increasingly more similar to each other. The value of P(n) represents the percentage of the change of S(n), larger P(n) means more rapid change in values of S(n) vs. S(n−1).

The extracted pattern values form another series of numbers which are then stored in pattern store 704.

The pattern inspector 705 selects the values contained in pattern store 704 by the following steps:

Select a specific position, say, m, within the pattern store 704 and identify all of the values within a window of size 2M−1 of position m:

$$P(m-M+1), P(m-M+2), \ldots, P(m-1), P(m),$$
$$P(m+1), \ldots, P(m+M-2), P(m+M-1)$$

These values are then added together by the pattern value collector 706 and yields a result C(m), in the following way:

$$C(m) = -P(m-M+1) - \ldots - P(m-1) - P(m) + P(m+1) + \ldots + P(m+M-1)$$

The value of M is a constant which is chosen so that there are sufficient number of values of P to be included in the calculation of C within the sliding window of 2M−1. Preferably, the value of M is 15.

From the above, it is noted that C(m) will be a large number when there is a sharp dip in the values of pattern values P( . . . ) at position m. Otherwise, C(m) tends to be small values.

Finally, the value C(m) is compared with a user given threshold 707 to determine if a match has been found between the two fingerprints, and the frame number is determined through the above process and signaled as output to histogram collector 709.

The histogram collector 709 gathers all of the pattern values C(m) that have exceeded the given threshold 707, count the number of times each value exceeds the threshold 707, and store them into an array. Each item in the array holds the value m, C(m) and the number of times that C(m) has crossed the threshold 707. Finally, the maximum value selector 710 inspects all such values within the histogram for the value that has appeared the most number of times. This value refers to the frame that is identified as the fingerprint matched frame. The output of the maximum value selector 710 is then delivered to the formatter 17, which also takes information from the relative position 115 to determine on which frame position that a match has been identified.

The Threshold Estimator

The threshold estimator 707 in FIG. 12 is used to determine if the pattern value will be selected as an entry to the histogram collector 709. The estimator derives the threshold value from the fingerprint B array. Specifically, it performs the SAD, SADD, pattern extractor operations between two identical fingerprint B arrays, and set the threshold value to be somewhere between 10% and 90% of the value when the two fingerprint arrays are offset by only one frame. In other words, the two groups of video B frames are frame-wise off-set by one frame, and the associated fingerprint B arrays then go through the SAD, SADD, pattern extractor and pattern value collector process to arrive at a pattern value.

When Fingerprint B is not Sufficiently Long

In the above discussions, it is assumed that video B has sufficiently more frames than video A, i.e., by at least 2M−1. In other words, array fingerprint B is longer than array fingerprint A by sufficient number of frames. This is generally required because the shifting operation between the two fingerprint arrays is part of the computation process.

Figure 16:
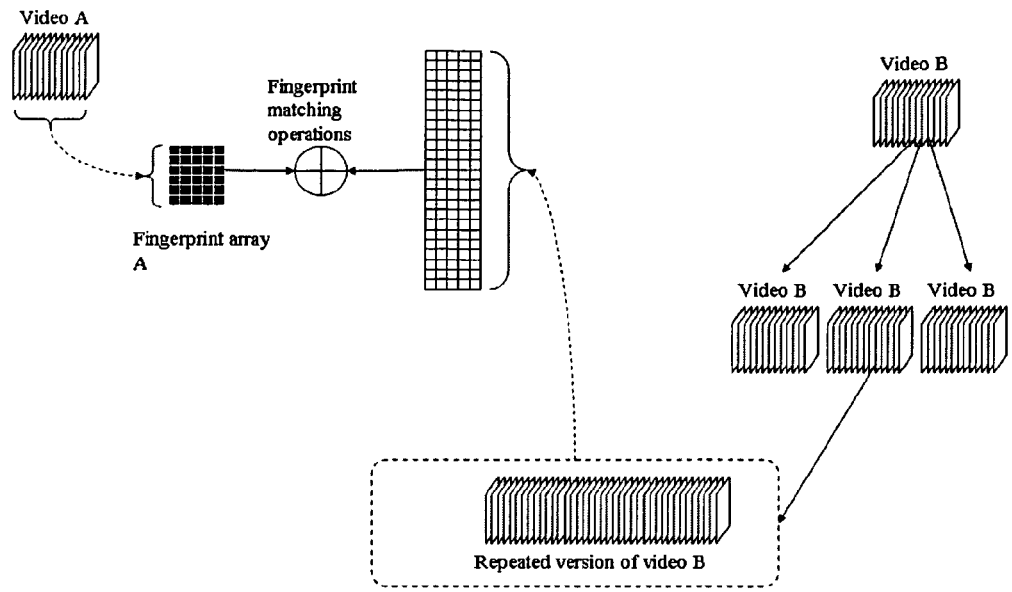
FIG. 16 is a schematic view for comparing two finite length video frame segment.

The above assumption is not always true. For example, video B can have the same number of frames as video A. Assuming that fingerprint for video B has been registered into the fingerprint database, it can apply the following modification to the above described method. To see this, consider FIG. 16. The video B video images are repeated three times and merged into a single group of video images. The repeated video B and video A are then matched using the same process as described above. It is obvious to see that it can also first extract the fingerprints from video A and video B, repeat the fingerprint B three times and merge it into a single fingerprint array and compare it with fingerprint A.

Another alternative is to pad zero frames to either sides of video B, i.e., add more frames to either side of video B frames. These frames have zero sample values.

If video B is shorter than A, then the method must be applied with the roles of A and B reversed, and repeat or pad video A if necessary.

The invention claimed is:

1. A system for identifying motion video/audio content by means of comparing a video A to a registered video B so as to determine if they are originally the same as each other, wherein said system at least comprises
   a fingerprint extractor A for fingerprint A from the video A;
   a fingerprint database for the registered video B; and
   a matcher which is adapted to search from the fingerprint database for the registered fingerprint B of the video B by means of comparison of fingerprint A with a shifting window of a possible fingerprint B, so as to determine that the video A is identical to the video B if a match is found,
   wherein a SAD operation module and a SSAD operation module are provided,
      the SAD operation module is adapted to calculate the sum of absolute difference (SAD) of every corresponding data samples between the fingerprint A and fingerprint B, the SAD operation is repeated for every video frames of the fingerprint A and fingerprint B, and
      the SSAD operation module is adapted to add all the SAD operation results together to form a single sum of SAD (SSAD) number, the same process is then repeated by shifting the position of possible fingerprint B relative to A by one frame, each such shift results in a new SSAD value generated, so a series of SSAD values are generated and saved as a SSAD array, so a fingerprint match is identified by a sharp drop in the SSAD values just before the match and a sharp increase in SSAD values just after the match.

2. The system of claim 1, wherein a pattern array, a pattern extractor, a pattern store array, a pattern inspector, a pattern value collector, and a histogram collector are also provided,
   the pattern array is adapted to store the SSAD values to detect the sharp drop pattern within the SSAD values;
   the pattern extractor is adapted to inspect all neighboring SSAD values and obtains pattern values which are percentage of the change of neighboring SSAD values;
   the pattern store array is adapted to store the extracted pattern values;
   the pattern inspector is adapted to select the extracted pattern values within a window relative to a frame number;
   the pattern value collector is adapted to perform the signed addition operations for all the extracted pattern values within the window together to yield a result value; and
   the result value is compared with a user given threshold to determine if a match has been found between the fingerprint A and possible fingerprint B, if yes, the frame number is output to the histogram collector.

3. The system of claim 2, wherein the histogram collector is adapted to gather all of the pattern values that have exceeded the given threshold, count the number of times each value exceeds the threshold, and store them into an array, each item in the array holds the frame number, the pattern value, and the number of times that the pattern values have crossed the given threshold.

4. The system of claim 3, wherein a maximum value selector is adapted to inspect all such values within the histogram collector for the value that has appeared the most number of times, this value refers to the frame that is identified as the fingerprint matched frame, the output of the maximum value selector is then delivered to a formatter, which takes information from the relative position to determine on which frame position that a match has been identified.

5. The system of claim 3, wherein a threshold estimator is provided to determine if any pattern value is selected as an entry to the histogram collector, the estimator derives the threshold value from the fingerprint A array, it performs the SAD, SADD, pattern extractor operations between two identical fingerprint A arrays, and set the threshold value to be somewhere between 10% and 90% of the value when the two fingerprint arrays are offset by only one frame, the two groups of video A frames are frame-wise off-set by one frame, and the associated fingerprint A arrays then go through the SAD, SADD, pattern extractor and pattern value collector process to arrive at a pattern value.

6. The system of claim 1, wherein if the video B has less number of frames than the number of frames of video A plus 2M, the video images of the video B are repeated two, three or more times to merge into a single group of video images, where M is a constant which is chosen so that there are sufficient number of values of SSAD.

7. The system of claim 1, wherein the video B has less number of frames than the number of frames of video A plus 2M, it adds at least M frames to either sides of video B frames which have zero sample values, where M is a constant which is chosen so that there are sufficient number of values of SSAD.

8. The system of claim 1, wherein if the video B has the same number of frames as the video A, the roles of video A and video B are able to be reversed.

9. The system of claim 1, wherein a converter is used to make video A frames first go through it so as to form time-consecutive digitized video images if they are originally in analog format, and decompress the same if they are stored in a compressed data format.

* * * * *